United States Patent

[11] 3,584,187

| [72] | Inventors | John C. Majetich<br>Borough of Plum, Pa.;<br>Ralph B. G. Yeo, Lewiston, N.Y. |
|---|---|---|
| [21] | Appl. No. | 813,306 |
| [22] | Filed | Apr. 3, 1969 |
| [45] | Patented | June 8, 1971 |
| [73] | Assignee | The United States Steel Corporation |

[54] METHOD OF WELDING STAINLESS STEEL
9 Claims, No Drawings

[52] U.S. Cl. .................................................. 219/137,
29/492, 219/118
[51] Int. Cl. ................................................ B23k 9/00
[50] Field of Search ........................................... 219/137,
118; 29/492

[56] References Cited
UNITED STATES PATENTS
2,282,175  5/1942  Emerson ..................... 219/137X
2,330,601  9/1943  Larsen...................... 219/137
2,638,665  5/1953  Viles........................ 219/137X
2,907,866  10/1959  Yenni....................... 219/137X

*Primary Examiner*—J. V. Truhe
*Assistant Examiner*—George A. Montanye
*Attorney*—Forest C. Sexton ABSTRACT: A method for improving the weldability of stainless steels wherein, prior to welding by conventional processes, the steel surface is provided with a coating of at least one oxide selected from the group consisting of the oxides of iron, chromium, silicon, titanium, manganese, nickel, cobalt, molybdenum and calcium. The oxide coating may be applied by physically depositing a slurry of the oxide onto the steel surface, or by oxidizing the stainless steel surface by subjecting it to an elevated temperature in an oxidizing environment.

METHOD OF WELDING STAINLESS STEEL

BACKGROUND OF THE INVENTION

This invention relates generally to the welding of stainless steel and, more specifically, to a method for improving the weldability of stainless steel by the conventional gas shielded welding processes.

The best known prior art methods for welding stainless steels are the automated plasma or gas tungsten-arc welding processes using a shielding gas of argon, helium, hydrogen or mixtures thereof. For example, a considerable amount of stainless steel tubing is made from coiled strip, about 0.1 inch thick, by automated equipment that uncoils the strip, forms it into a tube and joins the seam by a single-pass gas tungsten-arc (GTA) or plasma weld. Such welds are generally made without the application of flux or the addition of filler metal.

Stainless steels, when welded by any known process, frequently exhibit varying degrees of poor weldability, which is characterized by insufficient weld penetration at the conventional welding speed. That is to say, some stainless steel heats can be satisfactorily welded without complications, while others will yield satisfactory welds only if the welding speed is reduced, thus making the operation less economical. In extreme cases, even greatly reduced welding speeds still do not result in full penetration. Hence, the problems encountered may not only be severe, but sometimes insurmountable.

Although there have been many recent research studies in attempts to determine the factors which affect the weldability of stainless steel, the causes of poor weldability are not understood. Some experts have theorized that the concentration ranges of the alloy constituents should be more narrowly limited to assure good weldability. Yet, even with closer more limited concentration ranges, the weldability of stainless steel is still poor in many heats. Others have suggested that small amounts of residual refractory elements may cause the formation of refractory oxides that combine to produce refractory slags upon welding. Although such slags do of course influence the welding arc, it has become apparent that they alone are not responsible for poor weldability of stainless steel, since poor weldability is frequently encountered in heats being virtually free of the refractory residuals considered menacing.

SUMMARY OF THE INVENTION

This invention is predicated upon our unexpected discovery that the weldability of all stainless steels can be substantially improved if, prior to welding by gas shielded welding processes, the steel surface is first provided with a suitable oxide coating. The oxide coating will permit full penetration welding at substantially increased welding speeds. Although the oxides of iron and chromium are preferred for optimum results, the oxides of silicon, titanium, manganese, nickel, cobalt, molybdenum and calcium will serve to improve weldability of stainless steels an appreciable degree.

Accordingly, it is an object of this invention to provide a method of improving the weldability of stainless steels whereby a suitable oxide coating is provided on the surface of the steel prior to welding by conventional gas-shielded welding processes.

It is another object of this invention to provide a process for improving the weldability of stainless steels whereby, prior to welding by conventional gas-shielded welding processes, an oxide slurry is applied onto the steel surface and allowed to dry.

It is still another object of this invention to provide a method for improving the weldability of stainless steels whereby, prior to welding by conventional gas-shielded welding processes, the steel is heated sufficiently in an oxidizing environment to provide an oxide coating thereon.

DESCRIPTION OF THE PREFERRED EMBODIMENTS

As noted above, the crux of this invention resides in the provision of a suitable oxide coating on the surface of stainless steel which will improve the steel's weldability. That is to say, the oxide coating will promote full penetration welding at substantially enhanced welding speeds. The oxide coating should comprise one or more of the oxides selected from the group consisting of the oxides of iron, chromium, silicon, titanium, manganese, nickel, molybdenum and calcium. For optimum results, the oxides of iron and chromium are preferred. Of the oxides remaining, those of silicon, titanium and manganese are preferred over the oxides of nickel, cobalt, molybdenum and calcium. Practically any conceivable method for applying oxide coating will suffice.

According to one practice of our invention, powders of the selected oxide or oxides are mixed with a volatile liquid to form a slurry. The slurry is then brushed, painted or sprayed onto the stainless steel surface along the weld path and allowed to dry. The oxide powder will of course remain adhering to the steel surface after the volatile liquid has evaporated. Since the bond between the oxide and metal substrate is obviously not very strong, precautions must be taken to avoid wiping the oxide powder off of the steel surface prior to welding.

Although any volatile liquid, such as water for example, will suffice for the slurry matrix, we have preferred to use acetone because of its fast drying characteristic. In applying a silicon oxide coating, however, we have found water-glass (i.e. an aqueous solution of sodium silicate, $NaO\text{-}SiO_2$) to be most effective. This of course provides an oxide of sodium as well as silicon, but the sodium oxide is not detrimental.

Neither the concentration of the slurry nor the particle size of the oxide in the slurry is of critical significance. It should be sufficient to say that the concentration is preferably heavy to yield a thick or pasty slurry so that the required amount of coating, as noted below, can be deposited with a minimum number of applications. The particle size of the oxide should be fine enough to remain in suspension within the slurry while the slurry is being applied. Accordingly, we have preferred commercially available powders of minus 300 mesh or finer, although larger particle sizes such as minus 100 mesh will suffice.

The extent of the oxide coating is critical since either too little or too much coating will not yield an improvement in weldability, and may even adversely affect weldability. With the exception of calcium oxide, CaO, the effective amount of oxide coating is roughly within the range established by the empirical formula: 0.4 to 2.0 multiplied by the specific gravity of the oxide applied, the product expressed in milligrams per square inch. For example, $Fe_2O_3$ has a specific gravity of 5.24, and following the above formula, the effective range for an $Fe_2O_3$ coating would roughly be 0.4 (5.24) to 2.0 (5.24) mg./sq. in., or 2.096 to 10.48 mg./sq. in. Expressed more generally, the effective range for $Fe_2O_3$ is indeed from about 2 to about 10 mg./sq. in. As noted above, however, CaO does not follow the empirical formula. Rather, to be effective for the purposes of this invention, CaO should be applied within the range 20 to 40 mg./sq. in.

When the stainless steel surface has been coated with an oxide as described above, it may be welded using any of the conventional gas-shielded welding processes, and a substantial improvement in weldability will be realized. That is, full penetration welding can be achieved at greater welding speed than is possible without the oxide coating. In addition a narrower, smoother weld bead will result when using the oxide coating giving further evidence of improved weldability.

Since all stainless steels essentially comprise iron and chromium, the oxide coating may consist of oxides of iron and chromium derived from the steel itself. Hence, another method for applying the oxide coating is to heat the stainless steel or the surface thereof to a temperature in excess of about 1400° F. and subject it to an oxidizing environment for a sufficient time to allow the formation of the required oxide coating. A sufficient oxide coating is usually characterized by a visible blue coating upon cooling. Periods of from 2 to 15 minutes should be sufficient for most stainless steels.

To exemplify the detailed characteristics of this invention, the two tables below contrast the prior art with the improved weldability of stainless steel according to this invention. Table I illustrates the improved penetration at a constant high welding speed, while table II illustrates the increased welding speed for a constant full penetration weld.

Specifically, table I illustrated typical results of some of the tests which were made to determine the influence of the oxide coating thickness. All welds in table I were performed on a single heat of AISI Type 316 stainless steel 0.120 inch thick using identical welding conditions at a rather fast welding speed of 17.5 inches per minute.

TABLE I

Influence of Coating Thickness on Weldability Response of Several Applied Powders

| Coating | Weight, mg./in.² | Penetration |
| --- | --- | --- |
| None | | None |
| $Fe_2O_3$ | 3.0 | Full |
| | 4.6 | Do. |
| | 9.4 | Do. |
| | 10.7 | Slight. |
| | 17.3 | None. |
| CaO | 4.7 | Do. |
| | 8.2 | Do. |
| | 9.1 | Do. |
| | 22.4 | Full. |
| | 27.0 | Do. |
| | 30.8 | Do. |
| $SiO_2$ | 3.3 | Do. |
| | 10.2 | None. |
| | 10.8 | Do. |
| Water-glass | 6.9 | Full. |
| | 17.4 | None. |
| | 24.4 | Do. |
| $Al_2O_3$ | 1.2 | Do. |
| | 2.8 | Do. |
| | 11.8 | Do. |
| | 22.1 | Do. |
| | 33.7 | Do. |
| MgO | 0.9 | Do. |
| | 4.1 | Do. |
| | 4.7 | Do. |
| | 8.1 | Do. |
| | 10.7 | Do. |

From table I above, it is apparent that a welding speed of 17.5 inches per minute was too fast for the uncoated test sample in that no measurable amount of full penetration could be achieved at the test speed. In a like manner, oxide coating falling outside the scope of this invention, namely $Al_2O_3$ and MgO, did not improve the weldability of the steel. However, oxide coatings in accordance with this invention greatly improved the weldability of this heat of steel to such an extent that full penetration of the weld was realized when the effective amount of oxide was present. Similar results have been obtained with other oxide coatings of this invention, namely $Fe_3O_4$ and oxides of chromium, titanium, manganese, nickel, cobalt and molybdenum.

TABLE II

Effect of "Paint-On" Coating with $Fe_2O_3$-Acetone Slurry on Penetration for Different Types and Thicknesses of Austenitic Stainless Steel

| AISI type | Thickness, inch | Maximum travel speed resulting in full penetration, i.p.m. | | Percent improvement |
| --- | --- | --- | --- | --- |
| | | Uncoated | Coated | |
| 304 | 0.125 | 10 | 17.5 | 75 |
| 316 | 0.120 | 7.5–10 | 17.5 | (¹) |
| 316 | 0.083 | 5 | 22.5 | 350 |
| 316 | 0.095 | 7.5 | 15.0 | 100 |
| 321 | 0.120 | 12.5 | 17.5 | 40 |

¹ 75 min.

Table II contrasts the effect of a "painted-on" coating of $Fe_2O_3$ on six different stainless steel heats. Each weld was performed using identical procedures between the coated and uncoated samples. In each test the travel speed was increased in increments of 2½ inches per minute until the maximum welding speed for full penetration was reached.

It is readily apparent from the above table II that the "painted-on" $Fe_2O_3$ coating does indeed substantially improve the weldability of various stainless steels. For some samples, the improvement was as much as 350 percent. Similar tests with the other coatings of this invention showed similar improvements.

In all of the tests exemplified in the above tables, the same standard welding procedures were used. For each test, gas tungsten-arc welding was used with an argon shielding gas at a flow rate of 15 CFH. On samples from 0.060 to 0.089 inch thick, a three thirty-seconds inch electrode was used at a welding current of 200/210 amp. On samples 0.090 to 0.129 inch thick, a one-eighth inch electrode was used at a welding current of 300/310 amp. For all samples, a 1 percent thoriated tungsten electrode was used at a workpiece distance of 0.045 inch and a tip configuration of 120° vertex angle. A water cooled copper backup bar was always used.

We claim:

1. A method of welding stainless steel along a predetermined weld path comprising, coating the steel at least along the weld path with at least one oxide selected from the group consisting of oxides of iron, chromium, silicon, titanium, manganese, nickel, cobalt, molybdenum and calcium; said coatings of the group consisting of the oxides of iron, chromium, silicon, titanium, manganese, nickel, cobalt and molybdenum applied in an amount sufficient to fall within the range of about 0.4 to about 2.0 multiplied by the specific gravity of the oxide, the product expressed in milligrams per square inch, and said oxide of calcium applied in an amount sufficient to fall within the range of from 20 to 40 milligrams per square inch; and welding said stainless steel along the oxide-coated weld path utilizing conventional gas-shielded welding techniques.

2. The method of claim 1 in which said coating step includes applying water-glass onto said stainless steel surface, and allowing said water-glass to dry depositing an oxide coating including silicon dioxide.

3. The method of claim 1 wherein said coating step includes heating said stainless steel to a temperature in excess of 1400° F., and subjecting said heated steel to an oxidizing atmosphere for a time sufficient to allow the formation of an iron and chromium oxide coating.

4. The method of claim 3 wherein said heated steel is maintained in the oxidizing atmosphere for a period of from 2 to 15 minutes.

5. The method of claim 1 wherein said coating step includes forming a slurry consisting of a volatile liquid and a powdered form of said oxide, applying the slurry onto said stainless steel, and allowing the volatile liquid to evaporate depositing the oxide onto the steel surface.

6. The method of claim 5 wherein said applying step includes brushing the slurry onto the stainless steel surface.

7. The method of claim 5 wherein said applying step includes spraying said slurry onto the stainless steel surface.

8. The method of claim 5 wherein said volatile liquid is acetone.

9. The method of claim 5 wherein said oxide powder is finer than 100 mesh.